United States Patent
Pyles et al.

(10) Patent No.: US 10,586,045 B2
(45) Date of Patent: Mar. 10, 2020

(54) SYSTEM AND METHOD FOR DETECTING MALWARE IN MOBILE DEVICE SOFTWARE APPLICATIONS

(71) Applicant: The MITRE Corporation, McLean, VA (US)

(72) Inventors: Andrew J. Pyles, Williamsburg, VA (US); Jonathan E. Buttner, Annandale, VA (US); Nicolas Van Balen, Williamsburg, VA (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 15/234,328

(22) Filed: Aug. 11, 2016

(65) Prior Publication Data

US 2018/0046802 A1  Feb. 15, 2018

(51) Int. Cl.
| | | |
|---|---|---|
| G06F 21/00 | (2013.01) | |
| G06F 21/56 | (2013.01) | |
| H04W 12/12 | (2009.01) | |
| G06F 21/53 | (2013.01) | |
| H04W 88/02 | (2009.01) | |

(52) U.S. Cl.
CPC ............ G06F 21/566 (2013.01); G06F 21/53 (2013.01); H04W 12/12 (2013.01); G06F 2221/033 (2013.01); H04W 88/02 (2013.01)

(58) Field of Classification Search
CPC .. G06F 21/566; G06F 21/53; G06F 2221/033; H04W 12/12; H04W 88/02
See application file for complete search history.

(56) References Cited

U.S. PATENT DOCUMENTS

| | | | |
|---|---|---|---|
| 8,255,280 B1* | 8/2012 | Kay | G06F 21/53 |
| | | | 705/26.1 |
| 8,806,647 B1 | 8/2014 | Daswani et al. | |
| 9,104,870 B1 | 8/2015 | Qu et al. | |
| 9,679,139 B1* | 6/2017 | Monastyrsky | G06F 21/566 |
| (Continued) | | | |

FOREIGN PATENT DOCUMENTS

| | | |
|---|---|---|
| CN | 103685251 | 3/2014 |
| CN | 103902908 | 7/2014 |
| (Continued) | | |

OTHER PUBLICATIONS

Bläsing, Thomas et al., (2010), "An Android Application Sandbox System for Suspicious Software Detection," IEEE 5th International Conference on Malicious and Unwanted Software; 8 pages.

(Continued)

*Primary Examiner* — John B King
(74) *Attorney, Agent, or Firm* — Morrison & Foerster LLP

(57) ABSTRACT

A system and method for test a mobile device software application is provided. In one example, a mobile application can interface with an emulation environment or mobile device that has been loaded with a kernel module that is configured to intercept certain system calls made by the mobile application, log the system calls, and generate a report based on the logged system calls. A user of the test environment can interface with the environment via a web browser that can also be used to load one or more tests that can be applied to the mobile device software application.

24 Claims, 5 Drawing Sheets

(56) References Cited

U.S. PATENT DOCUMENTS

| | | | |
|---|---|---|---|
| 2004/0148514 A1* | 7/2004 | Fee | G06F 21/51 726/22 |
| 2007/0118575 A1* | 5/2007 | Kanda | G06F 17/30067 |
| 2013/0097706 A1 | 4/2013 | Titonis et al. | |
| 2015/0074810 A1 | 3/2015 | Saher et al. | |
| 2015/0150137 A1* | 5/2015 | Bettini | G06F 21/57 726/25 |
| 2015/0180875 A1* | 6/2015 | Kay | H04W 12/08 726/4 |
| 2015/0205963 A1* | 7/2015 | Zou | G06F 21/566 726/23 |
| 2016/0099963 A1* | 4/2016 | Mahaffey | H04L 63/0227 726/25 |
| 2016/0154960 A1* | 6/2016 | Sharma | G06F 21/56 726/25 |
| 2017/0032120 A1* | 2/2017 | Tolpin | G06F 21/53 |
| 2018/0012142 A1* | 1/2018 | Pistoia | G06N 99/005 |

FOREIGN PATENT DOCUMENTS

| | | |
|---|---|---|
| CN | 103971055 | 8/2014 |
| EP | 2 819 055 | 12/2014 |
| WO | WO 2015/100538 | 7/2015 |

OTHER PUBLICATIONS

Burguera, Iker et al., (2011), "Crowdroid: Behavior-Based Malware Detection System for Android," SPSM Proceedings of the 1$^{st}$ ACM Workshop on Security and Privacy in Smartphones and Mobile Devices; 11 pages.

Yan, Lok Kwong et al., (2012), "DroidScope: Seamlessly Reconstructing the OS and Dalvik Semantic Views for Dynamic Android Malware Analysis," USENIX Security Symposium; 16 pages.

Reina, Alessandro et al., (2013), "A System Call-Centric Analysis and Stimulation Technique to Automatically Reconstruct Android Malware Behaviors," EuroSec.; 6 pages.

* cited by examiner

SYSTEM AND METHOD FOR DETECTING MALWARE IN MOBILE DEVICE SOFTWARE APPLICATIONS

FIELD OF THE INVENTION

This disclosure relates to the vetting of mobile phone software applications to be loaded and used on a mobile phone device. More specifically, this disclosure relates to systems and methods for utilizing a combination of virtual environments and actual mobile devices to capture interactions between a mobile application and the operating system of a mobile device to determine whether malware is operating within a mobile device software application.

BACKGROUND OF THE INVENTION

Mobile application vetting, the process of determining which third-party applications are safe to deploy on mobile devices, is a challenging problem facing many personal, corporate, and government users of such devices. In the context of multiple mobile devices belonging to private businesses or government agencies, malicious software programs downloaded by users of the mobile devices can compromise the safety and security of the infected device but can also compromise the safety and security of an organization's entire computing network.

In an attempt to prevent malicious software ("malware") contained within a particular mobile device software application from infecting a user's device or an enterprise's computing network, mobile applications can be vetted by an enterprise security team to assess the safety of a particular mobile device software application. Cybersecurity teams can employ emulation environments that allow the team to assess the safety of a particular application before allowing for its use by users of the enterprise's mobile devices. An emulation environment or "sandbox" can refer to a testing environment that allows for the use and testing of software applications in an isolated environment (i.e., an environment in which the untested code cannot access a live mobile device or access a computing network). However, automated emulation environments can be easy to detect using a variety of known techniques.

Cybersecurity teams have also employed manual analysis of mobile applications by loading the application onto a physical mobile device that is then tested manually by an operator of the device, or through the use of sophisticated interactive disassembler tools such as Ida Pro™. However, while providing a more reliable analysis of an application, manual analysis can be expensive and time-consuming.

SUMMARY OF THE INVENTION

Accordingly, a system and method for detecting and analyzing mobile application applications for malware is provided. The system and method can include a hybrid of manual and automated analysis techniques that can capture interactions between a mobile software application under test and the underlying operating system with which the mobile app interacts. The system and method can further include capturing system calls and formatting the data for human readability so as to facilitate efficient detection. The data collection and analysis can be automated, while the final determination of whether a particular mobile application contains malware can be left to the user of the system disclosed herein.

DETAILED DESCRIPTION OF THE INVENTION

Figure 1:
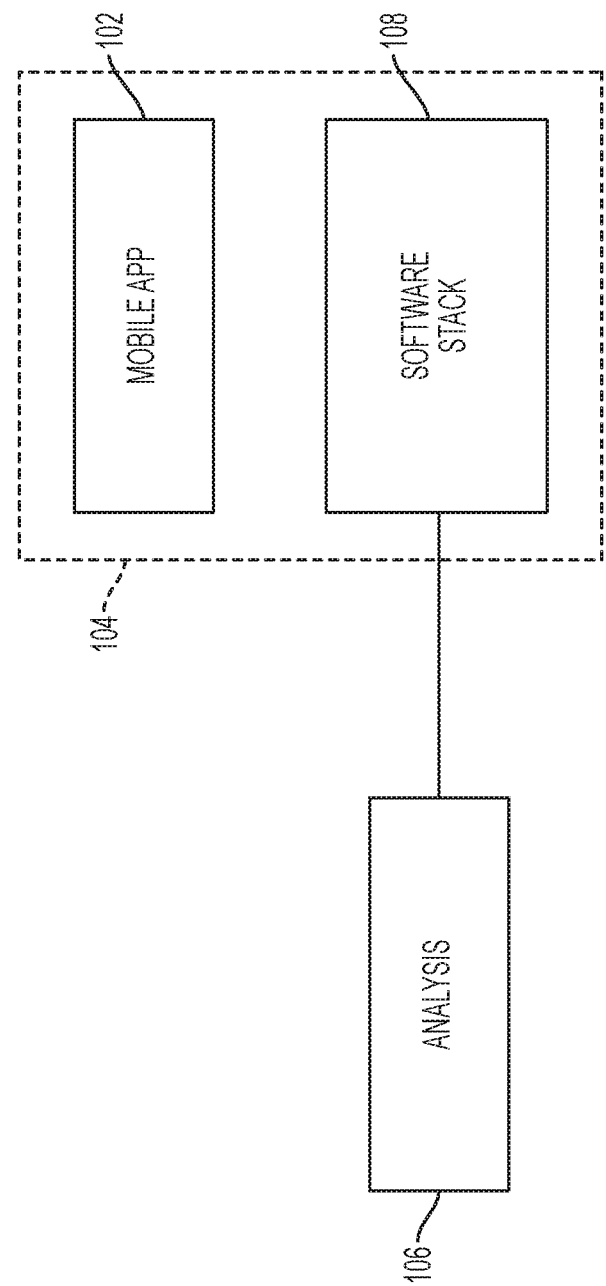
FIG. 1 illustrates an exemplary mobile application vetting system according to examples of the disclosure.

Described herein are systems and methods for vetting mobile phone software applications prior to their use on a user's mobile device. The systems and methods described herein can be used to ensure that a particular mobile software application does not contain malicious software that can threaten the security and integrity of not only the device on which the software application resides, but also the underlying network to which the mobile device is connected.

The systems and methods employ analytical tools designed to record system-level calls made from a mobile application to a software kernel residing on a physical mobile device or a mobile device emulation environment. The systems and methods can employ deep system call inspection techniques to process inter-process communications ("IPC") between a mobile application and the underlying operating system of the device of emulation environment. In one or more examples, users can establish feedback loops that can be used to perform arbitrary actions in response to specific observed behaviors.

An enterprise computing environment can include many different types of computing devices, including personal computers, laptops, and servers that are networked with one another to form an organization's (i.e., enterprise) computing environment over which a business can be conducted. Mobile devices such as tablet computers can also be part of an enterprise's computing environment, and can also be connected to an enterprise's computing network. In addition to being connected to a computing network, mobile devices can connect to other, more public networks, such as the World Wide Web. Given the ability of mobile devices to connect to both an enterprise's computing network and public networks, the use of mobile devices such as tablets or phones can pose a risk to the enterprise computing network, potentially compromising sensitive data stored in the enterprise's network or reducing the functionality of the network. In addition, the ability of mobile devices to interact with public networks can also put the device itself at risk, compromising the functionality of the device and also compromising the security of the device.

One method by which access to public networks can compromise the security of an enterprise mobile device and/or network is via mobile software applications ("mobile apps"). Mobile apps are software applications that a user of a mobile device can purchase and/or download over the Internet from an e-commerce store or other online entity. While many mobile apps can enhance the functionality of the mobile device, or provide utility to the user of the mobile device, they can also act as a vehicle for malware to penetrate not only the mobile device but also any computer networks that the mobile device may connect to.

Therefore, in an enterprise computer security environment, mobile apps that users of the mobile devices wish to download are conventionally vetted by an enterprise computer security team who, once the vetting has occurred, can authorize the download of the mobile app. Vetting a mobile app can include determining whether or not a mobile app contains any malware designed to compromise the security or integrity of the mobile device on which it resides or the computer networks with which it shares information.

One exemplary method of vetting a mobile app is to run the app in an emulation environment. FIG. 1 illustrates an exemplary mobile application vetting system according to examples of the disclosure. In the system depicted in FIG. 1, a mobile application 102 that is to be vetted can be downloaded over the Internet or other public network into an emulation environment 104. Emulation environment 104 can be a computer program of a physical device that is configured to recreate a typical environment in which a mobile application 102 would operate. The emulation environment 104 can tightly control computing resources available to the mobile application 102 so as to allow for the mobile application to be tested while at the same time either completely mitigating or minimizing the potential for the mobile application to compromise the security of a device or network. Examples of computing resources that can be controlled are network access of the mobile application, and the ability to inspect the host system or read from input devices. In many cases, these types of functionalities are disallowed by the emulation environment altogether, but in some examples the functionalities can be restricted.

Once the mobile application 102 has been downloaded into the emulation environment 104, it can then proceed to be operated in a normal fashion via the emulation environment. For example, any inputs that are to be sent to the mobile application can be inputted via the emulation environment 104. Likewise, any system calls or outputs that are generated by the mobile application 102 can be fielded by the emulation environment 104 via the emulation environment software stack 108 (explained in detail below). In this way, if malware exists within the mobile application 102, any malicious system calls or improper network access can be fielded by the emulation environment 104, and more specifically the emulation environment software stack 108, as opposed to by a real-world device.

The system can also include an analysis module 106 that can analyze the interactions between the emulation environment software stack 108 and the mobile application 102. The analysis module 106 can observe the interactions between the mobile application 102 and the emulation environment software stack 108 and look for certain behaviors or patterns of behaviors that can be commensurate with the operation of malware within the mobile application 102. As an example, if a mobile application attempts to access device-sensitive data such as a user's login credentials or web history and then attempts to send that data to an external web server via the Internet, analysis module 106 can detect that activity and alert a computer security professional performing the analysis of such conduct by the mobile application 102. Based on the information generated by the analysis module 102, the computer security professional can render a decision as to whether the mobile application 102 can be deployed on enterprise mobile devices.

Use of an emulation environment with an automatic analysis tool as described above can provide an efficient and scalable solution to the laborious task of vetting a mobile application. Automated methods such as those described above can often vet applications quickly. However, an automated system such as that described above may not be as reliable as manually vetting a mobile application (see discussion below), and may have a low guarantee of observing and identifying malicious behavior. Advanced malware can even defeat this type of detection if the emulation environment is detected.

Manual analysis can also be used to vet a mobile application. This type of analysis involves having skilled, highly specialized analysts reverse-engineer the app and explore all execution paths. This type of analysis can be a reliable and accurate method to determine if a mobile application contains malware; however, the method can be prohibitively expensive and may not scale well in an enterprise environment. The high skill, cost, and time requirements to implement a manual method of analysis may make it infeasible to use as a general-purpose vetting technique for large volumes of applications.

Each of the methods to detect malware described above can take advantage of the fact that the operating system of a mobile device or emulation environment can act as the interface between substantially all of the resources and processes running on a device. Operating systems can manage substantially all resources and processes on the device. In order for a user to access said resources managed by an operating system, the user must request permission to do so. One method of procuring permission for access is through the use of a system call. Thus, in order to perform a task on a device, a process likely will use system calls via the operating system. In order to detect malware, system calls can be observed in order to extrapolate the goals of the malware, since malware most likely will use system calls to achieve its nefarious purposes.

Figure 2:
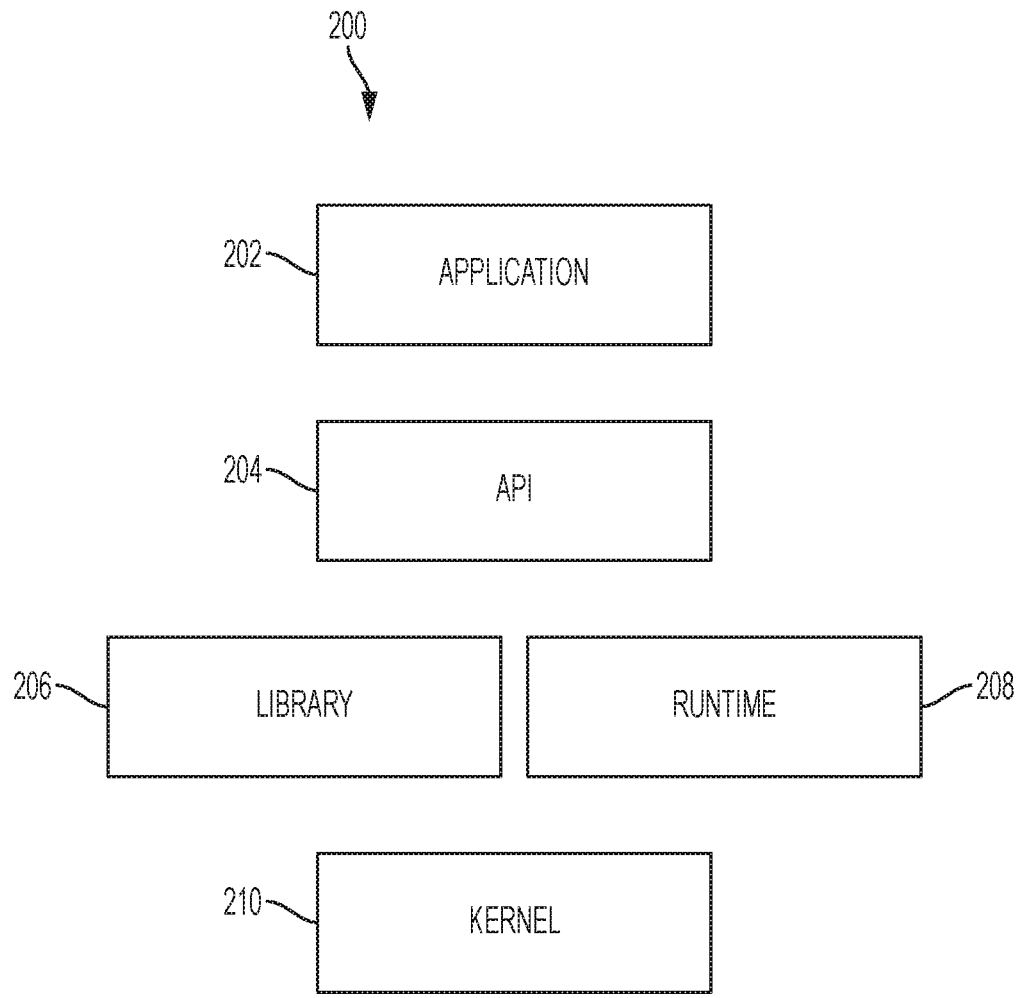
FIG. 2 illustrates another exemplary mobile application vetting system according to examples of the disclosure.

Thus, monitoring a device from within the operating system at the kernel, and more specifically monitoring the system calls from this perspective, can yield a reliable method for detecting malware. FIG. 2 illustrates an exemplary mobile device operating system software stack according to examples of the disclosure. The operating system software stack 200 can begin with application 202, which represents a mobile device application that is downloaded to a mobile device. Mobile application 202 can interface with application program interface ("API") 204. Application program interface 204 can represent one or more application program interfaces that allow the mobile application to access pre-programmed functions that are available on the mobile device, including the appearance of user interfaces, notifications, and other data related to the device that the application is interfacing with.

Libraries 206 can contain native libraries of the operating system and can perform various functions, such as managing device displays, various databases employed by the mobile device, graphics libraries, etc. The operating system runtime 208 can be utilized by a mobile application 202 to convert its bytecode into native instructions that are later executed by the mobile device's runtime environment. Finally, since the kernel 210 can be responsible for managing all hardware and resources, hooks running within this privileged environment can act as a hardware abstraction layer between the hardware of the mobile device and the operating system software stack 200.

As described above, the operating system can act as the interface between substantially all resources and processes running on a mobile device. Thus, a mobile application may likely use system calls to interact with a mobile device, and by extension any malware residing within a mobile application will also utilize system calls in order to carry out its malicious purposes. Therefore, system calls can be observed so as to determine that malware exists within a given mobile device software application, and system calls can be further observed to determine the specific malicious intent of the malware for the mobile device on which it is operating.

Generally, the intent of malware can fall into two categories: information theft, and device control. In the case of information theft, the malware may attempt to access a user's private information stored on a mobile device, and transmit that data to a third party. As an example, the malware may access the file system or sensors of a mobile device that are accessible via the application program interface of the mobile device. This information may include SMS messages, account information, identity data, audio or visual data gathered through the microphone or camera, passwords inferred from accelerometer measurements, etc. In order to make use of this information, the malware may transmit the gathered data to a third-party malicious user using the Internet to connect to a server, or networking devices such as Bluetooth to connect directly to another malicious device in the physical vicinity.

Device control can refer to behaviors in which the malware attempts to perform unwanted tasks on a mobile device, such as running a botnet on the mobile device or limiting access to the device through the use of ransomware. Malware that is attempting to control a device in most cases will require some form of privilege escalation (i.e., an attempt to gain elevated access to resources that are normally protected from an application or user), and may execute unwanted processes ultimately forcing the computing resources of the mobile device to focus on the mobile application in which the malware resides. In many cases, privilege escalation may be used to steal data or require file system access to gain device control.

Malware can also attempt to conceal its presence if it detects that the mobile application in which it resides is being analyzed in an emulation environment. As described above, an emulation device can recreate the software stack that a mobile application would see when operating on a mobile device. Malware can detect this emulated software stack and gate itself until it can confirm that it is no longer operating in the emulation environment. Many of the emulator-detection mechanisms can rely on artifacts that are detectable through the results of calls to the functions provided in the operating system stack API 204 or through examining objects at the lower levels of the underlying kernel 210.

Given the threats to a mobile device described above, as well as the limitations that a fully automatic or manual vetting process can engender, a method that utilizes a hybrid of automated and manual analysis by capturing system calls and formatting the data for human readability is provided. The setup of the analysis, the collection of data, and basic data analysis can be performed automatically while the final determination and interactions can be left to a human analyst to perform manually.

Figure 3:
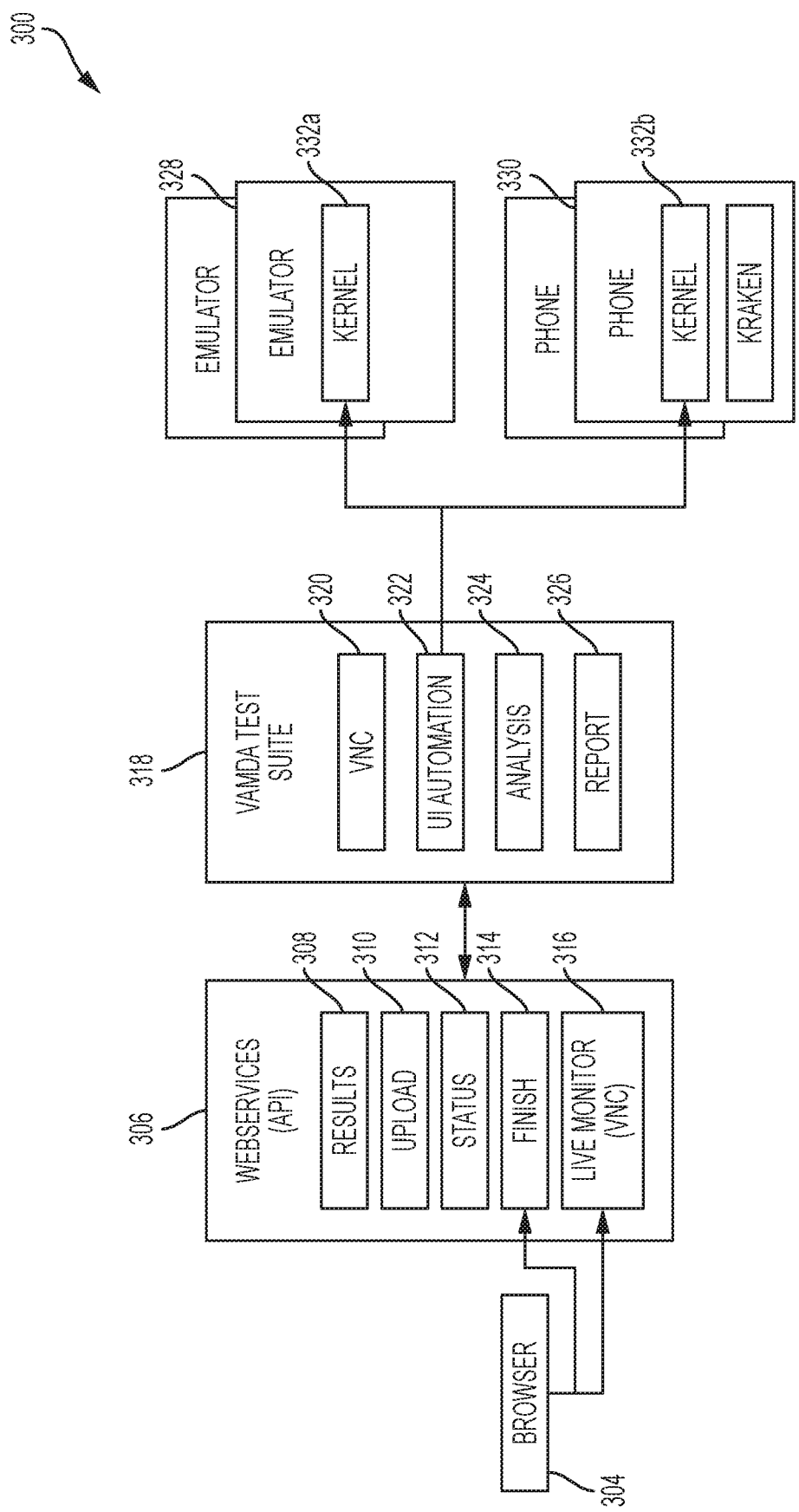
FIG. 3 illustrates another exemplary mobile application vetting system according to examples of the disclosure.

FIG. 3 illustrates an exemplary mobile application vetting system according to examples of the disclosure. The exemplary mobile application vetting system illustrated in FIG. 3 can operate in an integrated manner with various modules (discussed below) that are configured to communicate with one another. The system 300 can include a web services API module 306 that can act as both a user interface and an application. The system can also include a test suite 318 that includes a plurality of code scripts that can provide automation for the control of the testing, as well as the configuration of the device being tested. It can also organize the files that are of interest to the analyst. Finally, a kernel module running inside the operating system kernel can provide system call monitoring functionality. A system call can refer to the way in which a mobile application requests a service from the kernel of the operating system it is executed on.

As illustrated in FIG. 3, the web services API module 306 and test suite 318 can interface with either an emulator 328 or mobile device 330 or both simultaneously. The emulator 328 and the mobile device 330 can include a kernel module 332a and 332b, respectively. The kernel modules 332a and 332b can operate substantially the same as the kernel module discussed with respect to FIG. 2, but with one or more modifications in order to facilitate mobile application vetting.

The kernel modules 332a and 332b can be modified so as to capture substantially all of the information needed to discern the behavior of a mobile application without causing a noticeable impact to the performance of the application. This low-impact approach can be especially critical in ensuring that malware residing within a mobile application does not detect the kernel module.

The kernel modules 332a and 332b can run on their respective systems with full kernel privileges and without generating a user-level process. The kernel modules 332a and 332b can also be configured so as to remain hidden when, for example, a mobile application attempts to insert a module into the kernel with an insmod command. The kernel modules 332a and 332b can be configured to monitor all system calls and other behaviors of a mobile application, and create logs (i.e., a reporting of the mobile application's activity). The logs created by the kernel modules 332a and 332b can either be stored on the actual mobile device or emulator or, in another example, the kernel modules can be configured to transmit the logged data to a TCP socket, which can then transmit the logs to an external machine connected to the emulator 328 and/or mobile device 330. By transmitting the logs to an external device immediately rather than storing them, the kernel modules 332a and 332b can ensure that virtually no trace of the logs remains on the device.

The kernel modules 332a and 332b can be configured to hook a system call table of the operating system. Hooking a system call table can refer to the interception of the system calls from the mobile application to the operating system. Once the kernel modules 332a and 332b hook the system call table, they can redirect the functions of certain system calls specified by either a user of the vetting software or pre-determined in some other manner, within the system call table.

Using the Linux/Android® API as an example, the system calls can be divided into four categories: file system calls, network system calls, binder system calls, and process system calls. Within these four categories of system calls, the kernel modules 332a and 332b can be configured to hook a subset of calls within these categories. As an example within file system calls, and using the Linux/Android API as an example, the open( ), close( ), write( ), and read( ) system calls, which access the file system of the device, can be hooked by the kernel modules 332a and 332b.

Within the network system calls, the bind( ), connect( ), send( ), recv( ), sendto( ), and recvfrom( ) system calls are examples of system calls, that can be hooked by the kernel modules 332a and 332b. Within the process system calls, the fork( ), exec( ), and kill( ) functions are examples of system calls that can be hooked by the kernel modules 332a and 332b. Each of the above system calls are meant as examples, and are not intended to be construed as limiting in any way. The list of system calls that can be hooked by the kernel modules 332a and 332b can include more or fewer system calls than those that are listed. In another example, rather than hooking based on the systems calls themselves, the hooking of calls can be based on the parameters within a particular system call. For example, a hook function can be implemented when a particular system call is executed with particular parameters.

When a mobile application attempts a system call that is listed as a system call to be hooked, the kernel modules 332a and 332b can hook the system call and record the specified system calls as they happen. To determine if a specified system call is taking place or will take place, the kernel modules 332a and 332b can search for a known system from the system call table in order to locate its address in memory on the device 330 or emulator 328. Using one or more known offsets of the memory, the address of the system call of interest can read from the system call table stored in memory. The reference in the table of the system call read from memory can be redirected to point to a custom function that can take the system call parameters, record them in a log, and then call the original function. The return value of the original function can be captured before being returned by the wrapper function.

In some examples, such as the FORK or EXEC functions, which can use an ASSEMBLY trap rather than a conventional function reference in the system call table, the process outlined above for hooking a system call can be different. In such system calls, the kernel modules 332a and/or 332b can replace the references to the system calls with custom functions.

The information logged and recorded by the kernel modules 332a and/or 332b can be sent to a TCP socket of the device 330 or emulator 328. The port associated with the TCP socket can then be forwarded to a local port on the machine and manage the emulator or mobile device, wherein a service such as Netcat can be used to retrieve the information. As an example, the information can be sent in plaintext format with a comma-separated values ("csv") format. The kernel modules 332a and 332b can be further configured to support both Acorn RISC Machine ("ARM") and x86 architectures.

Returning to FIG. 3, the system 300 can also include a test suite 318. The test suite 318 can be configured to automate and streamline the acquisition and processing of behavioral logs from a mobile application that is to be tested. The test suite 318 can allow an operator of the system 300 to run tests on a mobile application with a minimal amount of human interaction and receive information about its behavior. To achieve this goal, the test suite 318 can be configured to operate an emulator 328 and/or a mobile device 330, clear any previous state from the emulator/mobile device, extract information about the application, install the application, run the mobile application, and retrieve the logs generated by the hooked system calls discussed above. The test suite 318 can extract information from the logs generated by the kernel modules 332a and 332b and generate a report that may be more readable to a human operator. In one example, the test suite 318 can prepare a mobile application for testing by extracting the manifest of the mobile application and searching for the package name and main activity name that may be needed to automatically launch the application. The manifest can be parsed for the extraction of intents and permissions to be used in later analysis.

The test suite 318 can be implemented using a set of Python scripts that automate and streamline the process of testing a mobile application. These scripts can read the necessary information from the manifest, start the emulator when applicable, install the mobile application, start the logging systems, start automated user interface interaction when applicable, collect the logs, generate a report, and place all the files into a specified location. The set of scripts can be configured to be modular such that any individual script can be replaced.

The test suite 318 can include a virtual network computer ("VNC") 320 that can allow the test suite 318 connect to a web browser. The test suite can include a user interface ("UI") automation module 322. The UI interface automation module 322 can interact with a mobile application under test to simulate any user interface interactions that would occur between a user application and a mobile application under test. In one example, the UI automation 322 can utilize a Python module to implement the UI automation process. The python module can obtain an xml representation of the screen and send touch events to UI-specific elements. The script can send touch events to substantially all clickable elements on the screen, starting at the top and working its way down.

The test suite 318 can also include an analysis module 324 that can be configured to analyze the logs received from the kernel module 332a and/or 332b and generate a report at report module 326 that can summarize the results of the analysis in a user-friendly format as described above.

The generated report can contain general information about the mobile application obtained from the manifest, such as the name of the main activity and the required permissions. The system calls are analyzed by type. Using the example above, the system calls can be categorized into the following categories: file system, network, process, and binder. As discussed above, the process system calls can include the creation and destruction of processes, and the kernel modules 332a and 332b can record every time the app or a child process calls for, calls exec, or attempts to kill a process. The file system calls are those related to the reading and writing of files. The kernel modules 332a and 332b can record files opened, number of bytes read, and number of bytes written, as an example. The network system calls can be recorded by the kernel modules 332a and/or 332b and include such information as all IP addresses that were connected to during the test and how many bytes were sent and received to each one. All IP addresses connected to by the mobile application can be passed through a reverse lookup to determine the location and domain of the IP. Finally, the binder calls report can include information on which calls were made and how many times each one was made, and identifies calls that may be used to access private information. Screenshots of the app can be obtained and then scaled and put into the report as a final step. The report can be generated in PDF format using Markdown.

The test suite is intended to automate and streamline the acquisition and processing of behavioral logs for the testing of the mobile application of interest. The system should allow an analyst to take a suspect mobile application and run tests with a minimal amount of human interaction and receive information about its behavior. To achieve this, the test suite needs to be able to start an emulator or have access to a physical device, clear any previous state from the emulator/device, extract information about the app, install the app, run the app, interact with the app, and retrieve the logs with the information. Finally, the system will extract information from the logs and generate a report that is more readable to humans.

The Test Suite 318 can prep the mobile application by extracting the manifest and finding the package name and main activity name that are needed to automatically launch the app. The manifest is also parsed for the extraction of intents and permissions to be used in later analysis.

For the emulator case, a custom kernel file (necessary to enable kernel modules) can be set to be used when the emulator is started up, and the user data file can be replaced with a clean copy when a new app is to be tested. If a physical device is being used, a kernel and clean initial RAM disk can be flashed to the device every time a clean state is needed.

Where the mobile application is being tested for use in a mobile device utilizing the Android® operating system, once the emulator/device is running, ADB is used to control it. The shell can allow the system to install the mobile application, start LogCat and tcpdump locally on the device, and send events to the device that allow basic navigation, such as unlocking the screen to be automated. The Test Suite system can also connect to the TCP socket that the kernel module writes to, and store the output in files on the machine where the Test Suite runs.

The Test Suite should also be able to simulate user interaction with the app. However, due to limitations with UI automation systems, the entering of such information as usernames, passwords, and the creation of accounts may not be handled appropriately. To circumvent this problem, this portion of testing an application can be sent to an actual user for manual interaction.

After the mobile application has been tested and the logs collected, the data can be filtered for the system calls done by the mobile application of interest. These system calls can then be grouped by type and listed in a report along with the information extracted from the manifest. The information can highlight any system calls that are known to be potential problems, and statistics about the calls. The report can then be used to gain a general picture of the mobile application's behavior.

Returning to FIG. 3, the system 300 can also include a web services API 306. The web services API 306 can facilitate the interaction between a user of the system 300 and the analysis tools located in the kernel modules 332a and 332b, and in test suite 318. The web services API module 306 can be accessed by a web browser 304. Web browser 304 can be utilized by a human user of the test system 300 to run the desired tests on the mobile application. The web services API 306 can allow a user to interact with the VNC 320 in the test suite 318. The web services API 306 can allow a user to monitor the VNC 320 using live monitor 316.

The web services API 306 can allow a user or analyst to manually initiate the testing of a mobile application and monitor the progress of that test. A set of uniform resource locators (URLs) can be used to send web requests to upload files to be analyzed, and the URLs can be used to download results or information on the status of the test being performed. In one example, one URL can be designated to handle a "post" request in which a user uploads a mobile application to the test suite 318, and also enters one or more test settings. The mobile application can be saved on a server (not pictured) with a unique identifier, and can send the user or analyst the identifier as a response to the post request. In one example, either the same URL or a separate URL can be used to handle "get" requests that can allow the user to obtain, results or status of the test being performed on the mobile application posted to the system in the "post" request. An HTML page can create the post request, thus allowing the user to access the post's functionality without need to write extra code.

For checking status, the web services API module 306 can utilize different URLs, as opposed to the URLs used in the upload case. A number of URLs can be set aside for the web services API module 306 that return if the test has finished running or not, or can allow for the download of the results if they exist. The user interface creates a page that can allow a user to view real-time updates of the status of the test, and to interact with the mobile application when appropriate. The webpage can provide an interface to the emulator if the mobile application is being run on it with an interactive interface that allows the emulator to be controlled from the browser. In one example, the web services API 306 can utilize three technologies to function: Django, RabbitMQ/Celery, and Swampdragon, each running on a separate server. Django can handle substantially all web requests from the user client.

The test system 300 can also include event framework functionality. The event framework functionality can utilize kernel modules 332a and 332b to observe system calls and execute a response to certain patterns of system calls if detected. The analyst, via the web services API module 306, can set responses to specific events. A set of rules containing actions and responses can be sent to the kernel module using a socket separate from the one used for logging as discussed above. When the kernel module detects that the action specified by the user has occurred, a pre-defined response can be executed. This can provide the analyst more flexibility to perform a specialized analysis without needing to reverse-engineer the code.

An example of a use for this framework is the capture of encryption keys. If a mobile application is sending encrypted information to an IP address and the analyst is interested in observing its contents, a rule can be sent to the module that checks when the connect system call is executed and compares the IP address to the one of interest. If the IP is matched, a response is triggered to search the memory of the device 330 or the emulation environment 328 for an encryption key.

In one or more examples, the system can also include a key extraction tool (not pictured). Mobile applications that include communication functionality may securely transmit the data to protect against eavesdropping. To prevent eavesdropping, mobile applications can encrypt their communication. When vetting an app for security vulnerabilities, a researcher may need to review the data that is transmitted and the app's implementation for securing the data transmission.

To aid a researcher's review of an application, a key-extraction tool can be included with the test system 300. The tool can search through a specific memory region of a process for data containing high entropy, which can be indicative of an encryption key. After identifying high-entropy regions in memory, the tool can display the data to the screen of the browser that the analyst is using so as to notify the analyst of the test system 300 to the presence of the encryption key.

Figure 4:
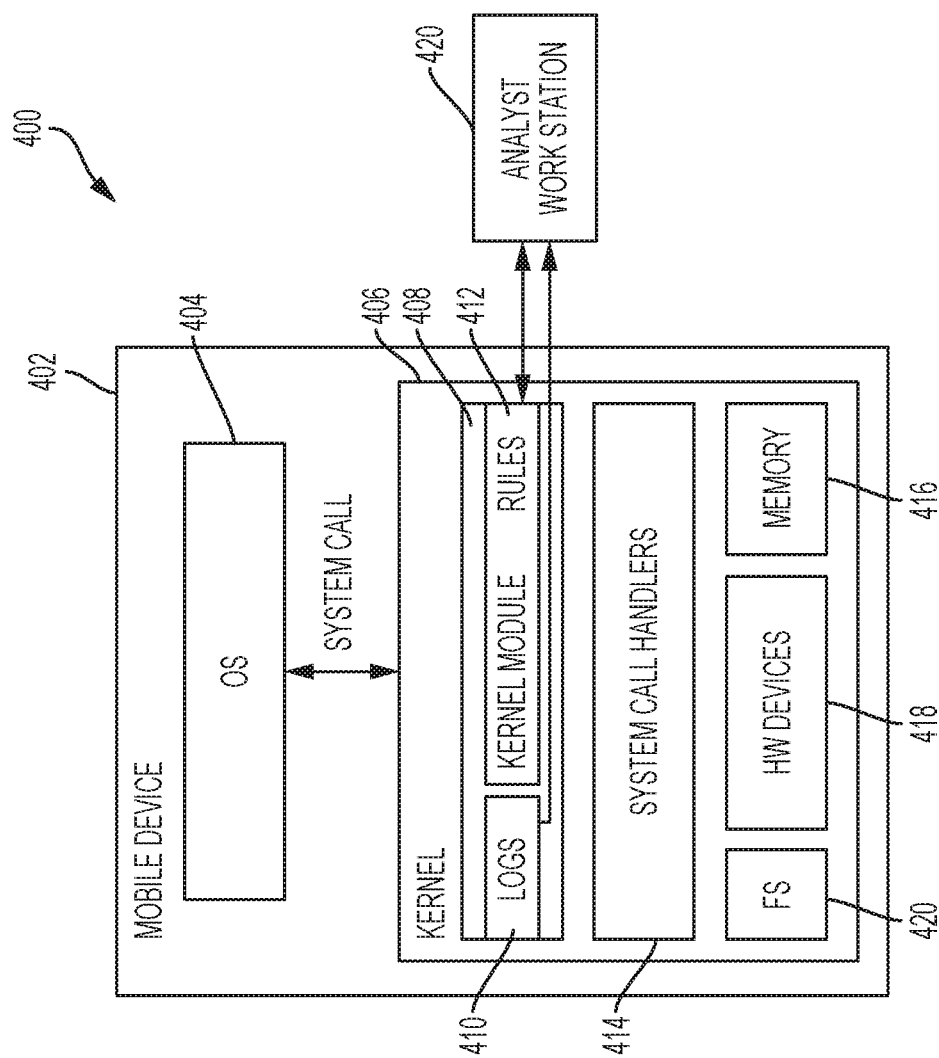
FIG. 4 illustrates an exemplary test system architecture according to examples of the disclosure.

FIG. 4 illustrates an exemplary test system architecture according to examples of the disclosure. The system 400 illustrated in FIG. 4 is substantially similar to the system illustrated in FIG. 3, but focuses on the components of the system at the device level. As illustrated in FIG. 4, there can be two major devices interacting with one another to form the system, a mobile device 402 and an analyst work station 420.

The analyst work station 420 can include the web services API 306 and test suite 318 components discussed in FIG. 3. A user/security analyst can interact with the analyst work station 420 so as to run tests on a mobile application using mobile device 402 as a test device.

Mobile device 402 can include the software stack normally associated with a mobile device. Mobile device 402 can include the operating system of the mobile device 404, which can issue system calls to the kernel 406 of the mobile device. As discussed above, the kernel 406 can include a modified kernel module 408 that can be configured to observe and log system calls made by the operating system 404. The kernel module 408 can include a rules module 412. The rule modules 412 can implement the event framework functionality described above. The kernel module 408 can also include a log module 410 that can be configured to log system calls made by the operation system 404 and transmit the logs to an external entity as described above.

An analyst working on the analyst work station 420 can interact with the kernel module 408 in various ways. In one example, the log files generated by the log module 410 can be transmitted directly to the analyst work station 420 for post processing by connection to a TCP server (not pictured) running in the kernel module 408. The logs can be post processed on the analyst work station or, in some examples, on a remote work station. In another example, filtering rules can be created by the analyst using XML or other markup language. The rules can be uploaded to the mobile device 402 via the rules module 412. The rules can specify various actions to be taken by the kernel module when a certain type of behavior is observed in the system calls logged by log module 410. When a behavior is identified that matches a rule specified in the rules module 412, the XML rule language can permit an action that can occur immediately when the condition is met. For example, a rule could be constructed that execution of a mobile application is to be immediately halted if the system call logs indicate that the mobile application under test has attempted to take a photo using the camera of the mobile device 402.

The kernel 406 can also include the other components of a conventional mobile device software stack, discussed with respect to FIG. 2, and can include system call handlers 414, file system 420, hardware devices 418, and memory 416.

While the example illustrated in FIG. 4 illustrates a mobile device 402, one of skill in the art would recognize that the mobile device 402 could also be an emulation environment rather than a physical mobile device as discussed above with respect to FIG. 3.

Figure 5:
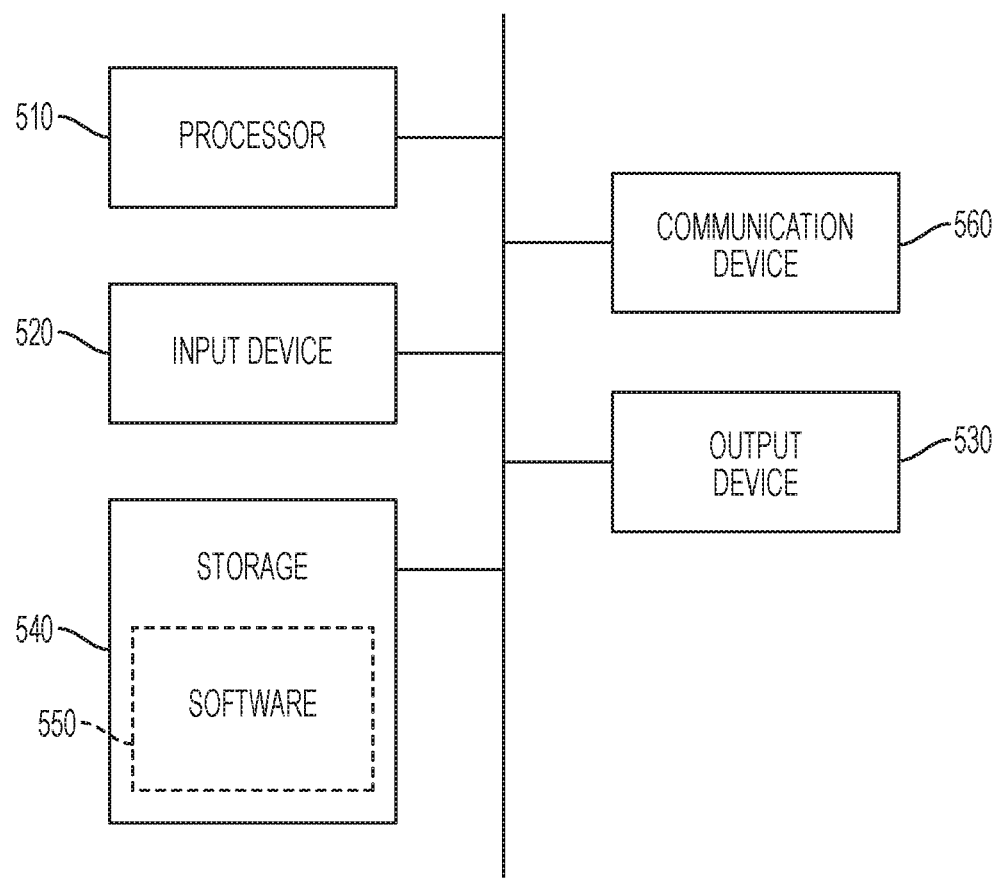
FIG. 5 illustrates an example of a computing device in accordance with one embodiment.

FIG. 5 illustrates an example of a computing device in accordance with one embodiment. Device 500 can be a host computer connected to a network. Device 500 can be a client computer or a server. As shown in FIG. 5, device 500 can be any suitable type of microprocessor-based device, such as a personal computer, work station, server, or handheld computing device (portable electronic device) such as a phone or tablet. The device can include, for example, one or more of processor 510, input device 520, output device 530, storage 540, and communication device 560. Input device 520 and output device 530 can generally correspond to those described above, and can either be connectable or integrated with the computer.

Input device 520 can be any suitable device that provides input, such as a touchscreen, keyboard or keypad, mouse, or voice-recognition device. Output device 530 can be any suitable device that provides output, such as a touchscreen, haptics device, or speaker.

Storage 540 can be any suitable device that provides storage, such as an electrical, magnetic, or optical memory including a RAM, cache, hard drive, or removable storage disk. Communication device 560 can include any suitable device capable of transmitting and receiving signals over a network, such as a network interface chip or device. The components of the computer can be connected in any suitable manner, such as via a physical bus, or wirelessly.

Software 550, which can be stored in storage 540 and executed by processor 510, can include, for example, the programming that embodies the functionality of the present disclosure (e.g., as embodied in the devices described above).

Software 550 can also be stored and/or transported within any non-transitory, computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 540, that can contain or store programming for use by or in connection with an instruction-execution system, apparatus, or device.

Software 550 can also be propagated within any transport medium for use by or in connection with an instruction-execution system, apparatus, or device, such as those described above, that can fetch instructions associated with the software from the instruction-execution system, apparatus, or device and execute the instructions. In the context of this disclosure, a transport medium can be any medium that can communicate, propagate, or transport programming for use by or in connection with an instruction-execution system, apparatus, or device. The transport readable medium can include, but is not limited to, an electronic, magnetic, optical, electromagnetic, or infrared wired or wireless propagation medium.

Device 500 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 500 can implement any operating system suitable for operating on the network. Software 550 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The systems and methods described above can enable monitoring and controlling of the network traffic generated and received by a mobile device. The systems and methods can be used to protect mobile devices such as smartphones from viruses, malware, adware, exploits, and other computer attacks.

The foregoing description, for purpose of explanation, has made reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments, with various modifications, that are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A method for testing a mobile device software application, the method comprising:
   receiving a list of one or more system calls of interest;
   initiating one or more tests on the mobile device software application, wherein the one or more tests include extracting a manifest from the mobile device software application and parsing the extracted manifest to extract information regarding one or more intents and one or more permissions associated with the mobile device software application, wherein the one or more intents are messaging objects used to request an action from one or more components of the mobile device software application;
   receiving a system call generated by the mobile device software application in response to the one or more tests;
   determining if the received system call matches one or more of the system calls on the received list of system calls of interest; and
   if the received system call matches one or more of the system calls of interest on the received list:
   hooking the one or more system calls generated by the mobile device software application in response to the one or more initiated tests, wherein hooking the one or more system calls includes recording one or more inputs of the system calls in a log file, calling the one or more system calls, and recording one or more return values of the one or more system calls in the log file.

2. The method of claim 1, wherein initiating one or more tests upon the mobile device software application comprises:
   emulating one or more touch events on the mobile device in response to the mobile device software application requesting a user input.

3. The method of claim 1, wherein conducting one or more tests upon the mobile device software application comprises:
   receiving a list, wherein the list includes one or more events and one or more pre-defined responses corresponding to each event;
   determining if an event generated by the mobile device software application matches one or more of the events on the received list; and
   if the event generated by the mobile device software application matches one or more of the events on the received list:
   initiating one or more responses to the event generated by the mobile device based on the one or more responses corresponding to the matched event.

4. The method of claim 1, wherein hooking the one or more system calls generated by the mobile device software application comprises:
   recording one or more call parameters of the system call generated by the mobile device software application; and
   executing the one or more system calls generated by the mobile device software application.

5. The method of claim 1 further comprising:
   transmitting the log of the received system call to one or more external computers.

6. The method of claim 1, wherein the receiving the system call generated by the mobile device software application and the determining if the received system call matches one or more of the system calls on the received list of system calls of interest is implemented on a kernel module of a mobile device emulation environment operating system.

7. The method of claim 1, the method further comprising:
   generating a report based on the generated log of the system call.

8. The method of claim 7, wherein generating a report based on the generated log of the system call includes determining whether the system call is of a type file system, network, process, or binder.

9. A testing system comprising:
   a memory;
   one or more processors;
   one or more programs, wherein the one or more programs are stored in the memory and configured to be executed by the one or more processors, the one or more programs when executed by the one or more processors cause the processor to:
   receive a list of one or more system calls of interest;
   initiate one or more tests upon the mobile device software application, wherein the one or more tests include extracting a manifest from the mobile device software application and parsing the extracted manifest to extract information regarding one or more intents and one or more permissions associated with the mobile device software application, wherein the one or more intents are messaging objects used to request an action from one or more components of the mobile device software application;
   receive a system call generated by the mobile device software application in response to the one or more initiated tests;
   determine if the received system call matches one or more of the system calls of interest on the received list;
   if the received system call matches one or more of the system calls of interest on the received list:
   hook the one or more system calls generated by the mobile device software application in response to the one or more initiated tests, wherein hooking the one or more system calls includes recording one or more inputs of the system calls in a log file, calling the one or more system calls, and recording one or more return values of the one or more system calls in the log file.

10. The system of claim 9, wherein initiating one or more tests upon the mobile device software application comprises:
    emulating one or more touch events on the mobile device in response to the mobile device software application requesting a user input.

11. The system of claim 9, wherein conducting one or more tests upon the mobile device software application comprises:
    receiving a list, wherein the list includes one or more events and one or more responses corresponding to each event;
    determining if an event generated by the mobile device software application matches one or more of the events on the received list; and
    if the event generated by the mobile device software application matches one or more of the events on the received list:
    initiating one or more responses to the event generated by the mobile device based on the one or more responses corresponding to the matched pre-defined event.

12. The system of claim 9, wherein hooking the one or more system calls generated by the mobile device software application comprises:
  recording one or more call parameters of the system call generated by the mobile device software application; and
  executing the one or more system calls generated by the mobile device software application.

13. The system of claim 9, wherein the one or more processors are further configured to:
  transmit the log of the received system call to one or more external computers.

14. The system of claim 9, wherein the receiving the system call generated by the mobile device software application and the determining if the received system call matches one or more of the system calls on the received list of system calls of interest kernel module of a mobile device operating system.

15. The system of claim 9, wherein the one or more processors are further configured to:
  generate a report based on the generated log of the system call.

16. The system of claim 15, wherein generating a report based on the generated log of the system call includes determining whether the system call is of a type file system, network, process, or binder.

17. A non-transitory computer readable storage medium having stored thereon a set of instructions for testing a mobile device software application that when executed by a computing device, cause the computing device to:
  receive a list of one or more system calls of interest;
  conduct one or more tests on the mobile device software application, wherein the one or more tests include extracting a manifest from the mobile device software application and parsing the extracted manifest to extract information regarding one or more intents and one or more permissions associated with the mobile device software application, wherein the one or more intents are messaging objects used to request an action from one or more components of the mobile device software application;
  receive a system call generated by the mobile device software application in response to the one or more tests;
  determine if the received system call matches one or more of the system calls on the received list of system calls of interest;
  if the received system call matches one or more of the system calls of interest on the received list:
  hook the one or more system calls generated by the mobile device software application in response to the one or more initiated tests, wherein hooking the one or more system calls includes recording one or more inputs of the system calls in a log file, calling the one or more system calls, and recording one or more return values of the one or more system calls in the log file.

18. The non-transitory computer readable storage medium of claim 17, wherein initiating one or more tests upon the mobile device software application comprises:
  emulating one or more touch events on the mobile device in response to the mobile device software application requesting a user input.

19. The non-transitory computer readable storage medium of claim 17, wherein conducting one or more tests upon the mobile device software application comprises:
  receiving a list, wherein the list includes one or more events and one or more pre-defined responses corresponding to each event;
  determining if an event generated by the mobile device software application matches one or more of the events on the received list; and
  if the event generated by the mobile device software application matches one or more of the events on the received list:
  initiating one or more responses to the event generated by the mobile device based on the one or more responses corresponding to the matched event.

20. The non-transitory computer readable storage medium of claim 17, wherein hooking the one or more system calls generated by the mobile device software application comprises:
  recording one or more call parameters of the system call generated by the mobile device software application; and
  executing the one or more system calls generated by the mobile device software application.

21. The non-transitory computer readable storage medium of claim 17, wherein the computing device is further caused to:
  transmit the log of the received system call to one or more external computers.

22. The non-transitory computer readable storage medium of claim 17, wherein the receiving the system call generated by the mobile device software application and the determining if the received system call matches one or more of the system calls on the received list of system calls of interest is implemented on a kernel module of a mobile device emulation environment operating system.

23. The non-transitory computer readable storage medium of claim 17, wherein the computing device is further caused to:
  generate a report based on the generated log of the system call.

24. The non-transitory computer readable storage medium of claim 23, wherein generating a report based on the generated log of the system call includes determining whether the system call is of a type file system, network, process, or binder.

* * * * *